(12) United States Patent
Muraji

(10) Patent No.: US 6,920,848 B2
(45) Date of Patent: Jul. 26, 2005

(54) DRIVER OR DIRECT ACTING VALVE FOR INTERNAL COMBUSTION ENGINE

(75) Inventor: Tetsuo Muraji, Odawara (JP)

(73) Assignee: Mikuni Corporation, Tokyo (JP)

( * ) Notice: Subject to any disclaimer, the term of this patent is extended or adjusted under 35 U.S.C. 154(b) by 0 days.

(21) Appl. No.: 10/467,503

(22) PCT Filed: Feb. 12, 2002

(86) PCT No.: PCT/JP02/01125

§ 371 (c)(1),
(2), (4) Date: Dec. 19, 2003

(87) PCT Pub. No.: WO02/064960

PCT Pub. Date: Aug. 22, 2002

(65) Prior Publication Data

US 2004/0079330 A1 Apr. 29, 2004

(30) Foreign Application Priority Data

Feb. 14, 2001 (JP) .......................................... 2001-036795

(51) Int. Cl.⁷ .............................. F02D 13/02; F01L 9/04
(52) U.S. Cl. .................. 123/90.11; 123/346; 251/129.1
(58) Field of Search ...................... 123/90.11, 345–347; 251/129.1, 129.15

(56) References Cited

U.S. PATENT DOCUMENTS

| | | | | |
|---|---|---|---|---|
| 4,976,228 A | | 12/1990 | Kawamura | 123/90.11 |
| 5,124,598 A | | 6/1992 | Kawamura | 123/90.11 |
| 5,781,397 A | * | 7/1998 | Schrey | 361/154 |
| 6,044,814 A | * | 4/2000 | Fuwa | 123/90.11 |
| 6,073,596 A | * | 6/2000 | Kemper | 123/90.11 |
| 6,263,857 B1 | * | 7/2001 | Obata et al. | 123/399 |
| 6,276,316 B1 | * | 8/2001 | Arai et al. | 123/90.11 |
| 6,285,151 B1 | * | 9/2001 | Wright et al. | 318/560 |
| 6,357,403 B1 | * | 3/2002 | Yano | 123/90.11 |
| 6,390,039 B2 | * | 5/2002 | Fuwa | 123/90.11 |
| 6,425,369 B2 | * | 7/2002 | Arai et al. | 123/348 |
| 6,477,993 B1 | * | 11/2002 | Katsumata et al. | 123/90.11 |
| 6,516,777 B2 | * | 2/2003 | Yano | 123/339.19 |
| 6,546,903 B2 | * | 4/2003 | Taniguchi et al. | 123/90.11 |
| 6,561,144 B1 | * | 5/2003 | Muraji | 123/90.11 |
| 6,588,385 B2 | * | 7/2003 | Fuwa | 123/90.11 |
| 6,604,497 B2 | * | 8/2003 | Buehrle et al. | 123/90.12 |
| 6,637,385 B2 | * | 10/2003 | Muraji | 123/90.11 |
| 6,655,328 B2 | * | 12/2003 | Kather | 123/90.11 |
| 6,718,919 B2 | * | 4/2004 | Muraji | 123/90.11 |
| 2003/0051688 A1 | * | 3/2003 | Chang et al. | 123/90.26 |
| 2004/0031455 A1 | * | 2/2004 | Muraji | 123/90.15 |
| 2004/0060528 A1 | * | 4/2004 | Hammoud | 123/90.11 |

FOREIGN PATENT DOCUMENTS

| | | | | |
|---|---|---|---|---|
| AU | 006001699 | | 11/2000 | |
| EP | 0367448 | | 5/1990 | |
| EP | 0395450 | | 10/1990 | |
| EP | 1045116 A1 | | 10/2000 | |
| JP | 2-123212 | | 5/1990 | |
| JP | 2-291411 | | 12/1990 | |
| JP | 2000-199411 | | 7/2000 | |
| JP | 2001-234743 | | 8/2001 | |
| JP | 2002-242708 | * | 8/2002 | ........... F02D/13/02 |
| WO | 00/26510 | | 11/2000 | |

* cited by examiner

Primary Examiner—Hai Huynh
(74) Attorney, Agent, or Firm—Wenderoth, Lind & Ponack, L.L.P.

(57) ABSTRACT

It is an object of the present invention to provide a drive unit for a direct-acting valve for internal combustion engines by which a quiet internal combustion engine can be obtained with noise suppressed. This system comprises an inlet valve 8 arranged slidably near an inlet port 4 of an internal combustion engine 12 for driving the inlet port to open and close, an electromagnetic actuator 1 that drives the inlet valve to open and close, and a current control unit 11 that controls a driving current supplied to the electromagnetic actuator. The current control unit continuously supplies the driving current, having a controlled variable value, to the electromagnetic actuator based on the operation condition of the internal combustion engine.

13 Claims, 7 Drawing Sheets

DRIVER OR DIRECT ACTING VALVE FOR INTERNAL COMBUSTION ENGINE

TECHNICAL FIELD

The present invention relates to a drive unit for a direct-acting valve for internal combustion engines, and more specifically, relates to a drive unit for a direct-acting valve for internal combustion engines that can reduce noise at the time of operation of the internal combustion engine.

BACKGROUND ART

Conventionally, as a valve apparatus for a internal combustion engine, there is known one in which an inlet valve and an exhaust valve are directly driven to open or close by an electromagnetic actuator. The valve driven in this manner is referred to as a direct-acting valve.

As shown by a curve A in FIG. 6, the drive unit for this direct-acting valve applies, for example, a positive current to the electromagnetic actuator, to move the valve in the opening direction by a specific distance, and applies a negative current to the electromagnetic actuator, to move the valve in the closing direction.

However, in the conventional drive unit for the direct-acting valve, there are the following problems that need to be given attention.

That is, when the valve is closed, as shown by a curve B in FIG. 6, since the valve is shifted at once from the top end position of the valve stroke to the closing position, the valve is shifted to the closing position without deceleration.

When the valve is shifted to the closing position without deceleration, impulsive sound occurs when the valve is seated on a valve seat, causing noise.

Particularly, when the internal combustion engine is in the idling state, or in a state of low revolution speed, the noise when the valve seats becomes noticeable.

The present invention has been achieved in order to solve the above problems. It is an object of the present invention to provide a drive unit for a direct-acting valve for internal combustion engines that can result in a quiet internal combustion engine with noise suppressed.

DISCLOSURE OF THE INVENTION

In order to achieve the object, a drive unit for a direct-acting valve for an internal combustion engine of the present invention comprises an inlet valve slidably arranged near an inlet port of the internal combustion engine for opening or closing the inlet port, an electromagnetic actuator that drives the inlet valve to open or close, and a current control unit that controls a driving current supplied to the electromagnetic actuator. The current control unit continuously supplies the driving current, having a controlled variable value, to the electromagnetic actuator based on the operation condition of the internal combustion engine.

The drive unit for the direct-acting valve for the internal combustion engine according to an aspect of the present invention is such that the current control unit continuously supplies the driving current having a controlled variable value to the electromagnetic actuator based on a target output of the internal combustion engine.

The drive unit for the direct-acting valve for the internal combustion engine according to another aspect of the present invention is such that the target output is detected by a control input of an accelerator provided to the internal combustion engine.

The drive unit for the direct-acting valve for the internal combustion engine according to another aspect of the present invention is such that when the internal combustion engine is in the idling state, the current control unit continuously supplies the driving current having the controlled variable value to the electromagnetic actuator.

The drive unit for the direct-acting valve for the internal combustion engine according to another aspect of the present invention is such that the idling state of the internal combustion engine is detected by a control input of an accelerator provided to the internal combustion engine.

The drive unit for the direct-acting valve for the internal combustion engine according to another aspect of the present invention is such that the idling state of the internal combustion engine is detected by the revolution speed of the internal combustion engine.

The drive unit for the direct-acting valve for the internal combustion engine according to another aspect of the present invention is such that the electromagnetic actuator comprises a linear motor.

BEST MODE FOR CARRYING OUT THE INVENTION

Figure 1:
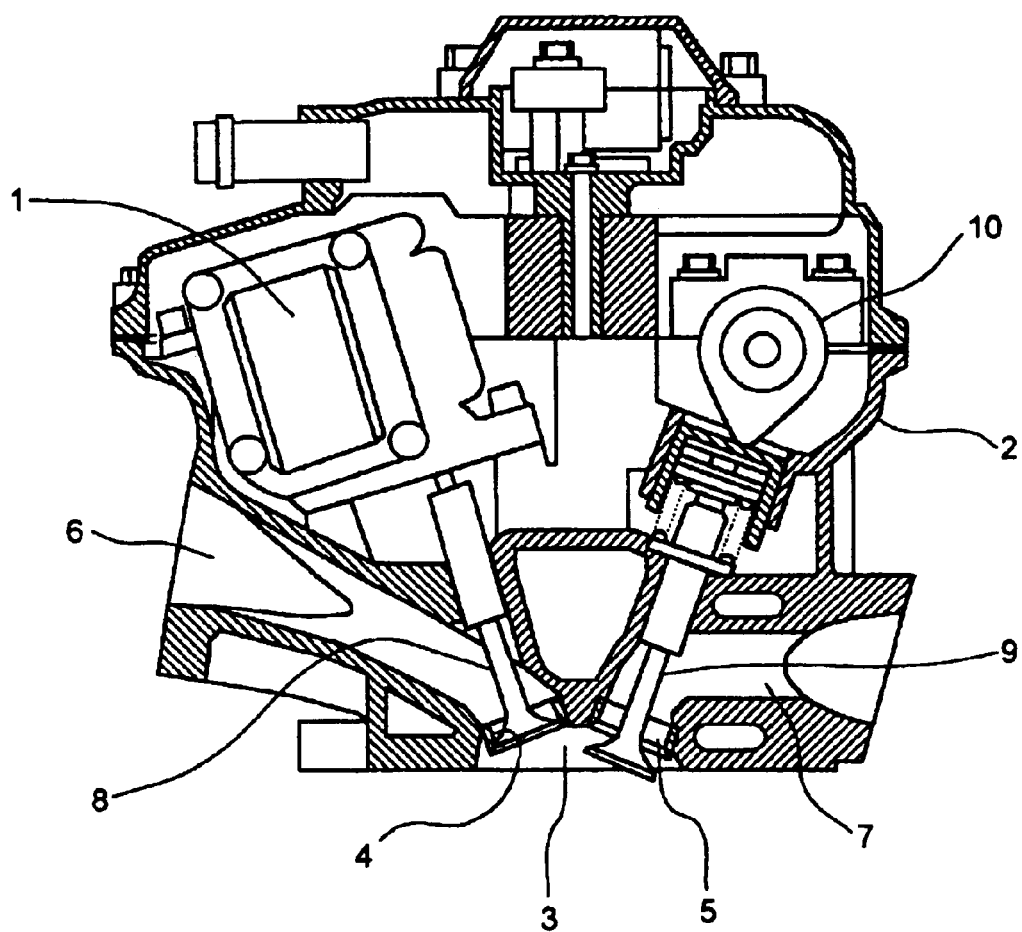
FIG. 1 is a longitudinal sectional view that shows a cylinder head in an internal combustion engine to which one embodiment of the present invention is applied.

One embodiment of the present invention is explained with reference to FIG. 1 and FIG. 2. FIG. 1 shows a cylinder head in an internal combustion engine, in which an electromagnetic actuator 1 constituting a drive unit for a direct-acting valve for internal combustion engines of the embodiment (hereinafter "drive unit") is assembled.

A cylinder head 2 shown in FIG. 1 comprises an inlet port 4 that opens toward a combustion chamber 3 for feeding air-fuel mixture to the combustion chamber 3, an exhaust port 5 that opens toward the combustion chamber 3 for exhausting combustion gas, an inlet path 6 communicated with the inlet port 4, and an exhaust path 7 communicated with the exhaust port 5.

An inlet valve 8 for opening or closing the inlet port 4 and an exhaust valve 9 for opening or closing the exhaust port 5 are provided slidably in the cylinder head 2, and the electromagnetic actuator 1 connected to the inlet valve 8 is fitted thereto.

A cam 10 that drives the exhaust valve 9 to open or close by rotating synchronously with the rotation of a crankshaft (not shown) in the internal combustion engine is provided axially above the exhaust valve 9.

As the electromagnetic actuator 1, a linear motor is used in this embodiment, and the inlet port 4 is opened or closed by shifting the inlet valve 8 in the axial direction thereof.

Figure 2:
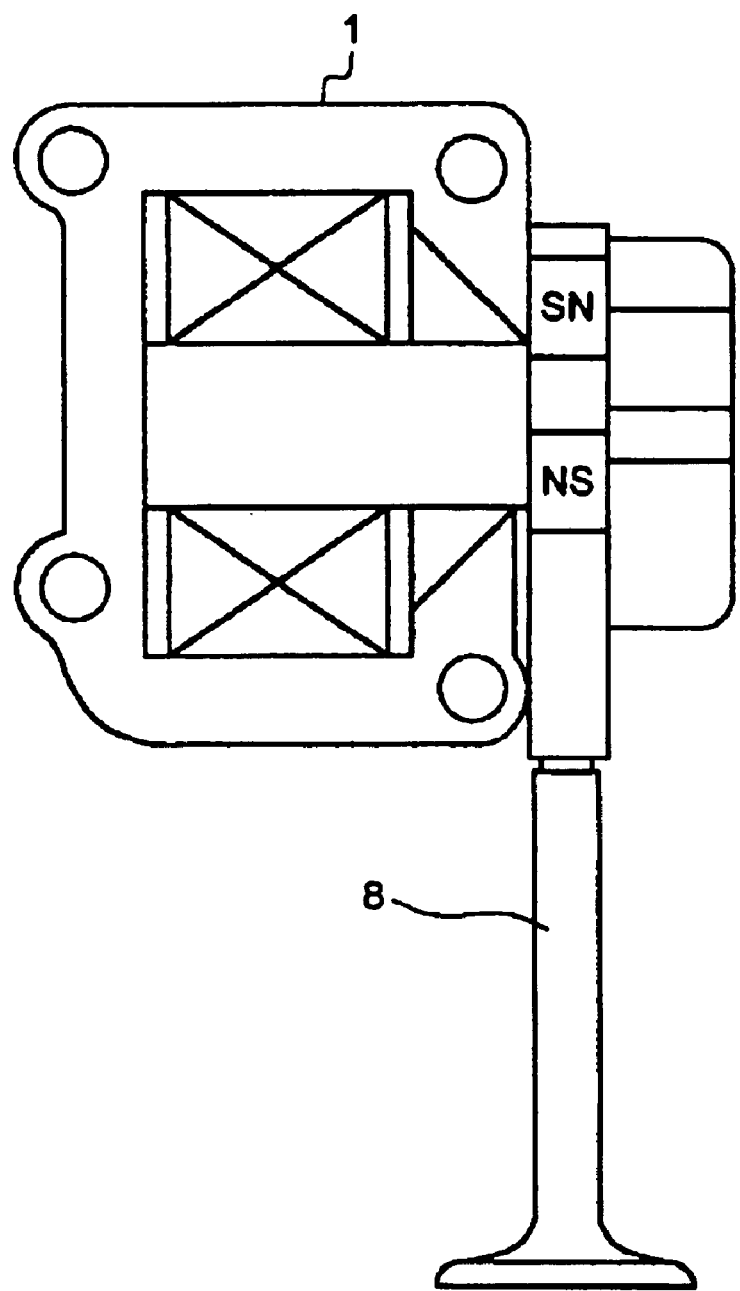
FIG. 2 is a longitudinal sectional view that shows a linear motor as an electromagnetic actuator applied to one example of the present invention.
Figure 3:
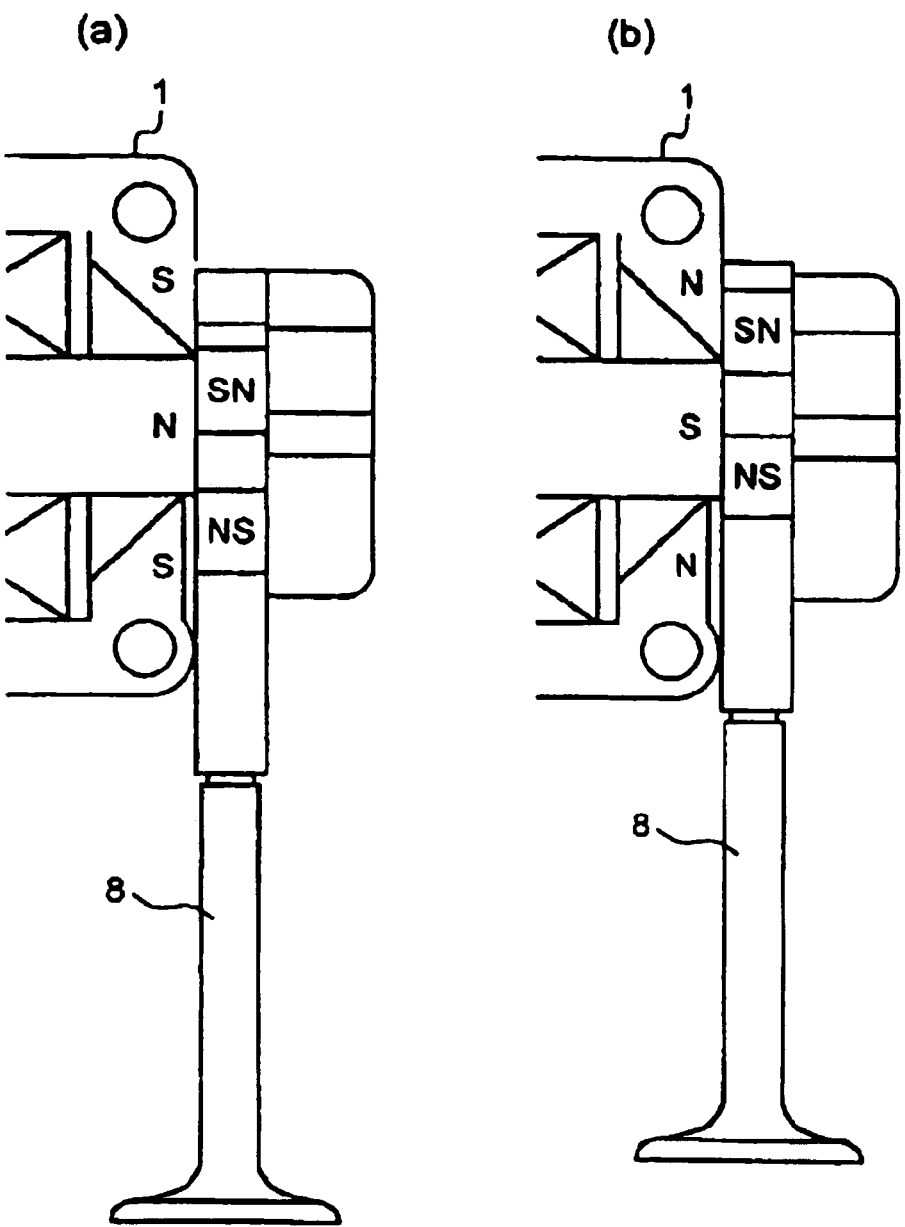
FIG. 3 is a longitudinal sectional view that shows the linear motor as the electromagnetic actuator applied to one example of the present invention, where (a) shows the condition when the valve is opened, and (b) shows the condition when the valve is closed.

The electromagnetic actuator 1 holds a valve seat for the inlet valve 8 to a position abutting against the inlet port 4 with a specific pressure, as shown in FIG. 2, at a center valve position in the non-energized condition, and shifts the inlet valve 8, as shown in FIGS. 3(*a*) and 3(*b*), to a valve opening position or a valve closing position, when a reciprocal current is applied.

The motion stroke, the valve opening time, and the valve closing time of the inlet valve 8 are set depending on the size and the application time of the current applied to the electromagnetic actuator 1.

Figure 4:
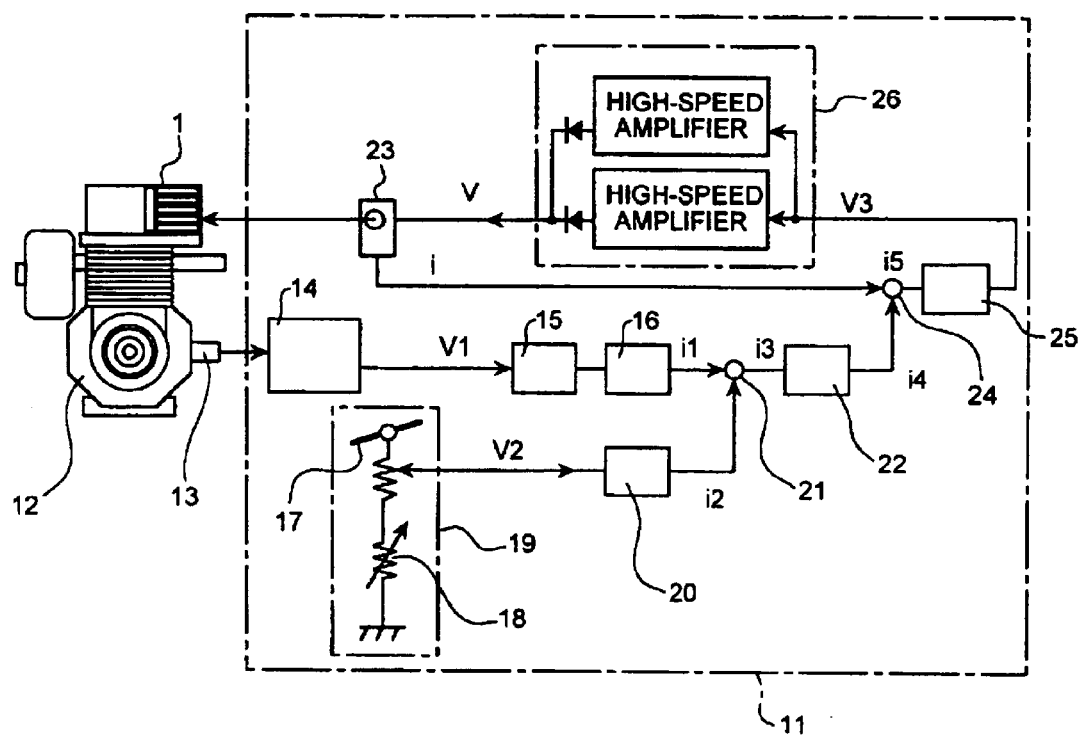
FIG. 4 is a block diagram that shows a control system in one embodiment of the present invention.

The drive unit according to this embodiment comprises, as shown in FIG. 4, a current control unit 11 that controls the value of driving current supplied to the electromagnetic actuator 1.

This current control unit 11 is for continuously supplying the driving current having a specific value to the electromagnetic actuator 1, based on the operation condition of the internal combustion engine.

More specifically, the current control unit 11 comprises an FV converter 14 that converts the revolution speed of the internal combustion engine 12 to a voltage V1, based on a pulse signal relating to a crank angle output from a crank angle sensor 13 provided in the internal combustion engine 12, amplifiers 15 and 16 that output a signal obtained by adjusting the level of the voltage V1 as a real revolution speed current signal i1, a load setting circuit 17 that sets a target output based on the accelerator opening and outputs the revolution speed of the internal combustion engine 12 corresponding to this target output as a voltage, and an idling setting circuit 18 that outputs the revolution speed of the internal combustion engine 12 at the time of idling as a voltage. The current control unit 11 also includes a target revolution speed setting circuit 19 that outputs a voltage V2 output from these, an amplifier 20 that outputs the voltage V2 from the target revolution speed setting circuit 19 as a target revolution speed current signal i2, an adder 21 that calculates a deviation between the real revolution speed current signal i1 and the target revolution speed current signal i2, an amplifier 22 that adjusts a deviation current signal i3 determined by the adder 21 to output it as a target current signal i4, an ampere meter 23 that detects a current i applied to the electromagnetic actuator 1, an adder 24 that calculates a deviation between the driving current i detected by the driving ampere meter 23 and the target current signal i4, an amplifier 25 that adjusts a deviation current i5 output from the adder 24, and an output amplifier 26 that applies the driving current V to the electromagnetic actuator 1 based on an adjusted deviation voltage V3 output from the amplifier 25.

The operation of the embodiment constituted in this manner is explained below, with reference to the engine data shown in FIG. 5.

Figure 5:
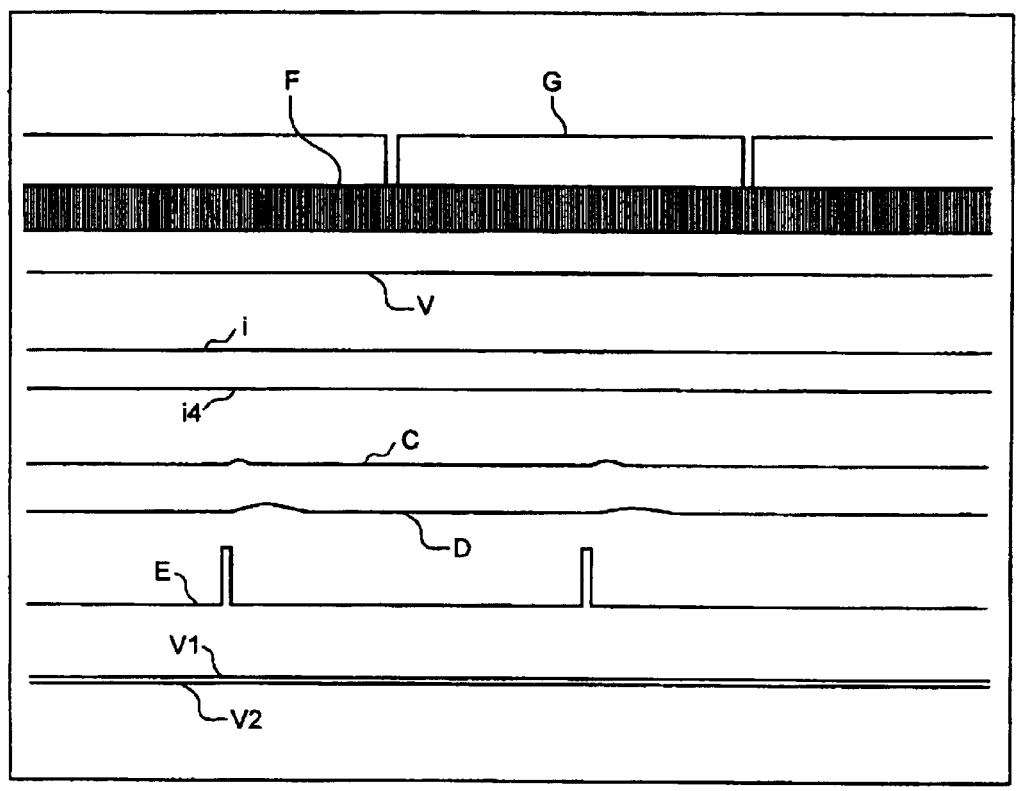
FIG. 5 is a timing chart of the control system in one embodiment of the present invention.
Figure 6:
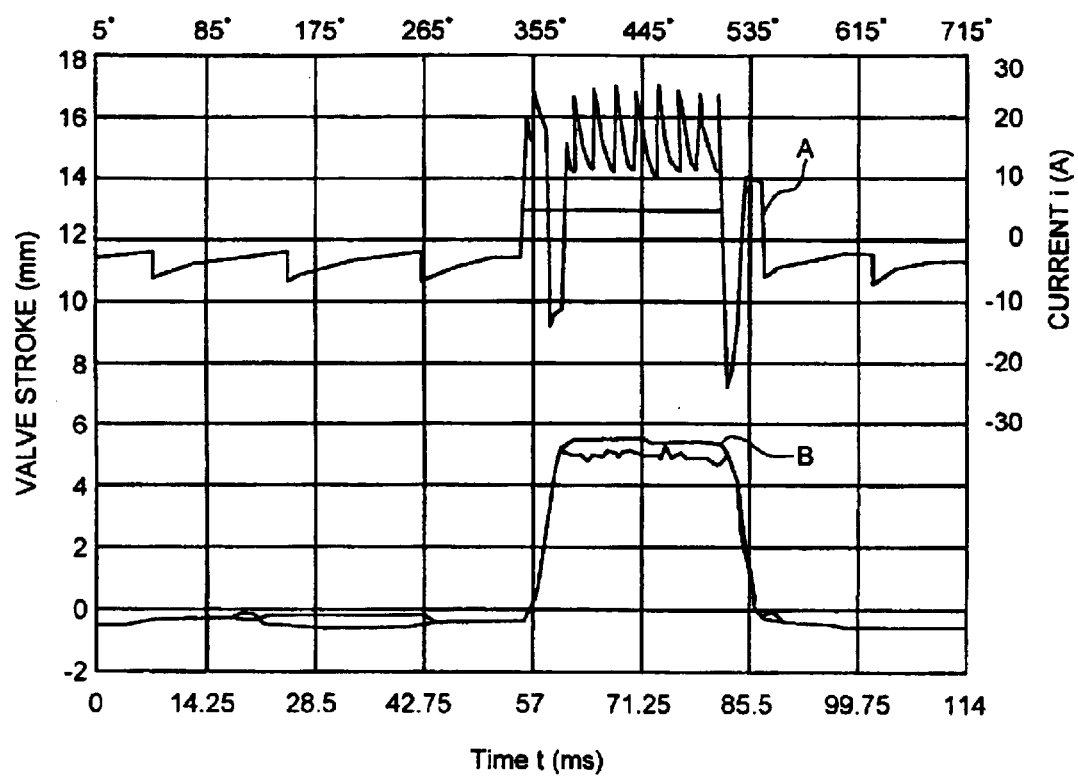
FIG. 6 is a characteristic diagram of a conventional direct-acting valve.

In FIG. 5, reference sign F denotes a crank angle signal output from the crank angle sensor 13, which is output continuously when the internal combustion engine 12 is in the operation condition.

A line E denotes a pulse signal at a fuel injection timing output to the fuel injection system, a line G denotes a pulse signal at the time of ignition, line C denotes a stroke of the inlet valve 8, and a line D denotes a flow velocity of a gas in the inlet path 6.

When the internal combustion engine 12 is in the operation condition, the voltage signal V1 as the information of the real revolution speed of the internal combustion engine 12 is output from the FV converter 14, and the voltage signal V2 as the information of the target revolution speed is output from the target revolution speed setting circuit 19.

The target current signal i4 is calculated from the voltage signal V1 and the voltage signal V2, the current i supplied to the electromagnetic actuator 1 is detected, and the drive voltage V is generated by the target current signal i4 and the current i, and applied to the electromagnetic actuator 1.

As a result, the driving current having a specific value is applied to the electromagnetic actuator 1, and the inlet valve 8 is pressed against the inlet port 4 by an attraction when the electromagnetic actuator 1 is not charged with electricity and an attraction by the driving current.

Hereunder, the sum total of both attraction forces is referred to as a valve closing force.

Figure 7:
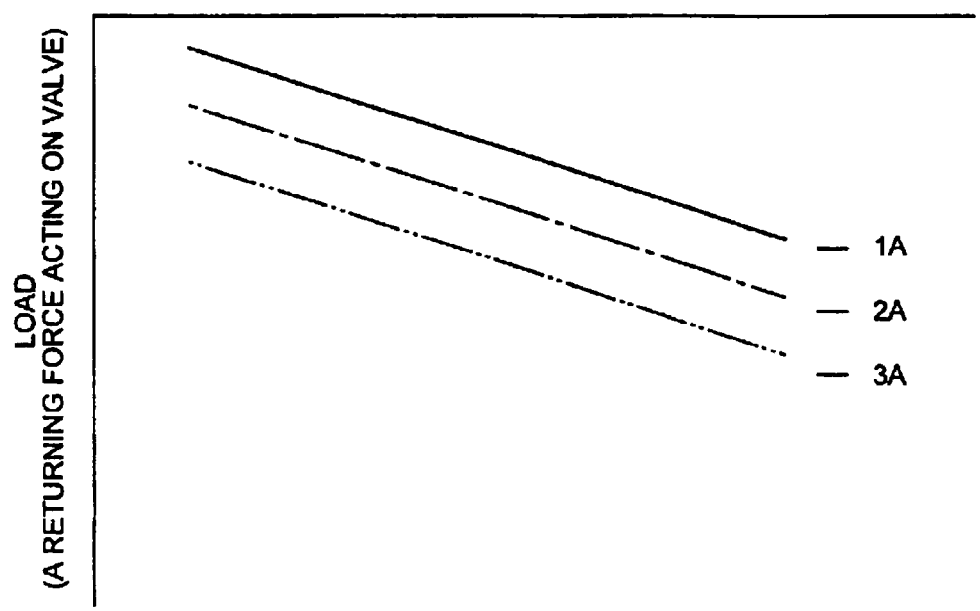
FIG. 7 is a diagram in which the relation between a returning force of an inlet valve by the electromagnetic actuator and an inlet valve lift in the one embodiment of the present invention is expressed, using the current applied to the electromagnetic actuator as a parameter.

The attraction, that is, a load as a returning force acting in a direction of closing the inlet valve 8, is, as shown in FIG. 7, determined by the size of the driving current applied to the electromagnetic actuator 1 and a lift (valve opening) of the inlet valve 8.

That is, as the absolute value of the driving current increases, and as the lift of the inlet valve 8 increases, the returning force increases in the direction of closing the inlet valve 8 by the electromagnetic actuator 1.

Therefore, the lift of the inlet valve 8 is controlled by controlling the value of the driving current supplied to the electromagnetic actuator 1.

In other words, the quantity of air intake flowing into the combustion chamber via the inlet port 4 can be controlled by controlling the value of the driving current applied to the electromagnetic actuator 1, and it is possible to control the output of the internal combustion engine 12 by allowing the inlet port 8 itself to function as a throttle valve.

Since the drive voltage V has little change, as shown in FIG. 5, the attraction generated by the driving current is kept substantially constant. Therefore, the valve closing force is also kept substantially constant.

Thereby, when the internal combustion engine 12 enters into the intake stroke, the pressure in the combustion chamber 3 decreases, and when a valve opening force from the negative pressure becomes larger than the valve closing force, the inlet valve 8 is attracted toward the combustion chamber (this state is shown by the line C expressing the lift in FIG. 5), and thereby air intake is performed.

This intake state is shown by the flow velocity in the inlet path 6, expressed by the line D in FIG. 5.

On the other hand, the gas flows into the combustion chamber 3 to increase the pressure in the combustion chamber 3, and when air intake is completed, the inlet valve 8 is shifted in the valve closing direction by the valve closing force by the electromagnetic actuator 1, and the valve seat is seated on the inlet port 4, whereby the inlet port 4 is closed to complete the intake stroke.

When the valve has the inlet valve 8 seated thereon, the stroke of the inlet valve 8 in the intake stroke is determined by the negative pressure in the combustion chamber 3, and hence the stroke is suppressed to a minimum.

This is clearly seen from the line C in FIG. 5, and the stroke is suppressed to a very small stroke.

Therefore, the shift quantity of the inlet valve 8 in the valve closing direction becomes small, the impact force at the time of seating the valve seat on the inlet port 4 can be suppressed, and as a result, the occurrence of noise can be suppressed.

Particularly, when the internal combustion engine 12 is in the idling state, since the lift of the inlet valve 8 is small, the occurrence of noise can be suppressed.

At the time of normal operation other than the idling condition, the voltage signal V2 as the information of the target revolution speed is set in the load setting circuit 17. However, the voltage signal V2 at the time of normal operation is set smaller as the target revolution speed increases, whereby the attraction of the inlet valve 8 by the driving current decreases, and the valve closing force decreases.

As a result, the stroke of the inlet valve 8 in the opening direction becomes large so as to increase the intake quantity to the combustion chamber 3.

Since the voltage signal V2 and the drive voltage V corresponding to the target revolution speed are kept constant, the revolution speed of the internal combustion engine 12 is kept at the target revolution speed.

When the internal combustion engine 12 is for a motor vehicle, the load setting circuit 17 is mechanically or electrically connected to the accelerator operated by a driver so that it can be adjusted by the operation of the accelerator.

The idling setting circuit 18 is connected to the accelerator mechanically or electrically, and outputs the voltage signal V2 at the time of idling when the accelerator is in a non-operated state.

As described above, in this embodiment, the electromagnetic actuator 1 allows a constant valve closing force resisting the inlet pressure of the internal combustion engine 12 to act on the inlet valve 8, whereby the inlet valve 8 is opened by a difference between the valve closing force and the valve opening force from the negative pressure generated in the combustion chamber 3.

The voltage signal V2 corresponding to the target revolution speed is set within a range of from the maximum value to zero.

In this manner, the intake quantity corresponding to the operation condition (load condition) required for the internal combustion engine 12 can be supplied without monitoring the lift and the valve opening period of the inlet valve 8.

The lift of the inlet valve 8 is automatically adjusted corresponding to the operation condition to be the minimum lift corresponding to the operation condition, and hence the impact at the time of seating the inlet valve 8 on the valve seat can be made as small as possible, thereby suppressing the occurrence of noise.

Particularly, at the time of idling, the effect becomes noticeable.

On the other hand, when the required operation condition is in a high revolution speed area, a drive voltage (−V) inverse to the drive voltage V described above is applied to the electromagnetic actuator 1 in the intake stroke of the internal combustion engine 12 to change the driving mode of the inlet valve 8, whereby it becomes possible to forcibly open the inlet valve 8.

Even in such a driving mode, since the noise generated from the internal combustion engine 12 itself at the time of high revolution speed increases, the seating sound of the inlet valve 8 does not attract attention.

At the time of high revolution speed, the inlet valve 8 is forcibly opened to ensure sufficient lift, whereby it becomes possible to sufficiently supply the intake amount.

Various shapes and sizes of the respective components shown in the embodiment are examples only, and can be variously changed based on the design requirements.

As explained above, the drive unit for the direct-acting valve for internal combustion engines according to the present invention comprises the electromagnetic actuator that drives the inlet valve to open or close, and a current control unit that controls the driving current to be supplied to the electromagnetic actuator. The current control unit continuously supplies the driving current having a specific value to the electromagnetic actuator, based on the operation condition of the internal combustion engine. Therefore, the inlet valve lift is automatically set by a balance between the valve opening force from the negative pressure acting on the combustion chamber of the internal combustion engine and the valve closing force, thereby suppressing the inlet valve lift to a minimum, to alleviate the impact force at the time of closing the valve. As a result, the occurrence of noise can be suppressed.

Particularly, in the condition that the noise generated by the internal combustion engine itself is small, such as at the time of idling, the impact noise at the time of seating the valve seat on the inlet valve is suppressed to thereby suppress the noise of the internal combustion engine at the time of idling. As a result, a quiet internal combustion engine can be obtained.

What is claimed is:

1. A drive unit for a direct-acting valve for an internal combustion engine, comprising:
    an inlet valve slidably arranged near an inlet port of the internal combustion engine for opening and closing the inlet port;
    a single electromagnetic actuator that drives said inlet valve in a manner to open and close the inlet port; and
    a current control unit that supplies a continuously controlled value of driving current, based on an operating condition of the internal combustion engine, to said single electromagnetic actuator.

2. The drive unit of claim 1, wherein said current control unit controls the driving current, having the controlled variable value, supplied to said electromagnetic actuator based on a target output of the internal combustion engine.

3. The drive unit of claim 2, wherein the target output is detected by a control input of an accelerator provided with the internal combustion engine.

4. The drive unit for the direct-acting valve for the internal combustion engine according to claim 3, wherein said electromagnetic actuator comprises a linear motor.

5. The drive unit for the direct-acting valve for the internal combustion engine according to claim 2, wherein said electromagnetic actuator comprises a linear motor.

6. The drive unit of claim 1, wherein, when the internal combustion engine is in an idling state, said current control unit continuously supplies the driving current, having the controlled variable value, to said electromagnetic actuator.

7. The drive unit for the direct-acting valve for the internal combustion engine according to claim 6, wherein the idling state of the internal combustion engine is detected by a control input of an accelerator provided to the internal combustion engine.

8. The drive unit for the direct-acting valve for the internal combustion engine according to claim 7, wherein said electromagnetic actuator comprises a linear motor.

9. The drive unit for the direct-acting valve for the internal combustion engine according to claim 6, wherein the idling state of the internal combustion engine is detected based on revolution speed of the internal combustion engine.

10. The drive unit for the direct-acting valve for the internal combustion engine according to claim 9, wherein said electromagnetic actuator comprises a linear motor.

11. The drive unit for the direct-acting valve for the internal combustion engine according to claim 6, wherein said electromagnetic actuator comprises a linear motor.

12. The drive unit for the direct-acting valve for the internal combustion engine according to claim 1, wherein said electromagnetic actuator comprises a linear motor.

13. A drive unit for a direct-acting valve for an internal combustion engine, comprising:

an inlet valve slidably arranged near an inlet port of the internal combustion engine for opening and closing the inlet port;

an electromagnetic actuator that drives said inlet valve in a manner to open and close the inlet port; and a current control unit that controls a driving current supplied to said electromagnetic actuator such that the driving current, having a controlled variable value, is continuously supplied to said electromagnetic actuator and based on an operating condition of the internal combustion engine so that during idling of the internal combustion engine, lift of said inlet valve is minimized to suppress noise.

* * * * *